(12) United States Patent
Nakamura

(10) Patent No.: US 8,960,778 B2
(45) Date of Patent: Feb. 24, 2015

(54) REVOLVING FRAME OF CONSTRUCTION MACHINE

(75) Inventor: Masao Nakamura, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/819,093

(22) PCT Filed: Nov. 10, 2011

(86) PCT No.: PCT/JP2011/075955
§ 371 (c)(1),
(2), (4) Date: Feb. 26, 2013

(87) PCT Pub. No.: WO2012/067014
PCT Pub. Date: May 24, 2012

(65) Prior Publication Data
US 2013/0223966 A1 Aug. 29, 2013

(30) Foreign Application Priority Data

Nov. 15, 2010 (JP) ................. 2010-254737

(51) Int. Cl.
*B62D 25/10* (2006.01)
*E02F 9/08* (2006.01)
*E02F 3/30* (2006.01)
*B62D 21/18* (2006.01)
*E02F 9/00* (2006.01)

(52) U.S. Cl.
CPC ............... *E02F 9/08* (2013.01); *B62D 21/186* (2013.01); *E02F 9/0816* (2013.01); *E02F 3/30* (2013.01); *E02F 9/006* (2013.01)
USPC ..................... 296/203.01; 414/687

(58) Field of Classification Search
CPC .... B62D 25/12; B62D 49/085; B62D 21/186; B62D 25/10; B62D 33/0617; B66C 23/62; B05C 11/02; B23K 11/115; B23K 11/253; B41J 2/4753; B60C 1/0016; B60C 1/00; B60C 1/0025; B60C 1/0008; B60C 15/06; B60C 9/0007
USPC ............... 296/203.01, 146.11, 146.6, 193.11, 296/190.11, 146.5, 146.8; 180/89.17, 180/69.21, 89.1; 280/762; 49/397
See application file for complete search history.

(56) References Cited

U.S. PATENT DOCUMENTS 6,540,036 B1 * 4/2003 Sugano ................. 180/68.1
6,615,942 B2 * 9/2003 Shinohara et al. ......... 180/69.21
(Continued)

FOREIGN PATENT DOCUMENTS

| JP | 3-54850 U | 5/1991 |
| JP | 2004-124357 A | 4/2004 |
| JP | 2010-196408 A | 9/2010 |

*Primary Examiner* — Glenn Dayoan
*Assistant Examiner* — Sunsurraye Westbrook
(74) *Attorney, Agent, or Firm* — Mattingly & Malur, PC

(57) ABSTRACT

A revolving frame is provided with left and right vertical plates installed upright on a bottom plate, and a front plate arranged on a front side of the bottom plate and connecting the left and right vertical plates to each other. A left reinforcing plate is provided at a corner where the left vertical plate and the front plate cross each other, and a right reinforcing plate is provided at a corner where the right vertical plate and the front plate cross each other. As a result, the corner portion where the left vertical plate and the front plate cross each other is reinforced by the left reinforcing plate while a left side closed space (LS) is formed, and the corner portion where the right vertical plate and the front plate cross each other is reinforced by the right reinforcing plate while a right side closed space (RS) is formed.

4 Claims, 11 Drawing Sheets

(56) References Cited

U.S. PATENT DOCUMENTS

| | | | |
|---|---|---|---|
| 6,922,925 B2 * | 8/2005 | Watanabe et al. | 37/466 |
| 7,481,289 B2 * | 1/2009 | Ueda et al. | 180/89.16 |
| 7,513,326 B2 * | 4/2009 | Miyachi | 180/68.4 |
| 2004/0161326 A1 | 8/2004 | Yamaguchi et al. | |

* cited by examiner

REVOLVING FRAME OF CONSTRUCTION MACHINE

TECHNICAL FIELD

The present invention relates to a revolving frame of a construction machine suitably used for a construction machine such as a hydraulic excavator, a hydraulic crane and the like, for example.

BACKGROUND ART

In general, a construction machine such as a hydraulic excavator is formed of an automotive lower traveling structure, an upper revolving structure that is rotatably mounted on the lower traveling structure through a revolving device, and a working mechanism provided on the upper revolving structure. The upper revolving structure includes a revolving frame rotatably supported on the lower traveling structure, a cab provided on the front side of the revolving frame, an engine mounted on the rear side of the revolving frame, a counterweight located on the rear side of the engine and mounted on a rear end portion of the revolving frame in order to keep a weight balance with the working mechanism and the like.

The revolving frame to become the basis of the upper revolving structure includes a flat-plate shaped bottom plate on which the revolving device is mounted, left and right vertical plates extending in the front and rear direction on the bottom plate and installed upright in the left and right direction at an interval and on which a foot portion of a boom constituting the working mechanism is mounted, and a front plate located on the front side of the bottom plate and connecting the vertical plates to each other.

Here, the front plate is installed upright on the bottom plate so as to be inclined toward the rear side and fixed to each of the left and right vertical plates at the both end portions. A cylinder mounting bracket for mounting a boom cylinder for driving a boom is fixed on the front surface side of the front plate. Moreover, the front plate connects the left and right vertical plates to each other and is also formed as a reinforcing member for bearing application (a load) of excavating reaction force transmitted from the working mechanism along with each of the vertical plates and the like (Patent Document 1).

PRIOR ART DOCUMENT

Patent Document

Patent Document 1: Japanese Utility Model Laid-Open No. Hei 3-54850 U

SUMMARY OF THE INVENTION

With a conventional art hydraulic excavator, when an excavating work and the like are performed by the working mechanism, a reaction force by the excavating work acts on each of the vertical plates and the front plate of the center frame as a large load. On the other hand, in the case of a work in a state where the working mechanism is lifted up, a load also acts so as to twist the vertical plates and the front plate due to swing of the working mechanism.

Thus, strength of the vertical plates and the front plate needs to be improved by increasing the plate thickness dimensions, for example, so that they can withstand the large load from the working mechanism and stably support the working mechanism. As a result, the weight of the hydraulic excavator increases, and problems such as deterioration of working performances, a rise of a manufacturing cost and the like occur.

In view of the above-discussed problems with the conventional art, it is an object of the present invention to provide a revolving frame of a construction machine which can stably support the working mechanism by improving the strength of the left and right vertical plates and the front plate without increasing the plate thickness dimension.

(1) In order to solve the above-described problems, the present invention is applied to a revolving frame of a construction machine provided with a flat-plate shaped bottom plate, left and right vertical plates extending in a front and rear direction and installed upright on the bottom plate at an interval in a left and right direction; and a front plate arranged on a front side of the bottom plate and connecting the left and right vertical plates to each other.

A characteristic of a configuration adopted by the present invention is that a left reinforcing member for reinforcing the left vertical plate and the front plate against a load from a working mechanism is fixedly provided at a corner portion where the left vertical plate and the front plate cross each other; and a right reinforcing member for reinforcing the right vertical plate and the front plate against a load from the working mechanism is fixedly provided at a corner portion where the right vertical plate and the front plate cross each other.

With this arrangement, a joint portion between the front plate and the left vertical plate can be reinforced by the left reinforcing member, and a joint portion between the front plate and the right vertical plate can be reinforced by the right reinforcing member. Thus, a firm support structural body against the working mechanism can be configured by the front plate, the vertical plates, and the reinforcing members without increasing the plate thickness dimension of the front plate and each of the vertical plates. As a result, a load such as an excavating reaction force and the like acting from the working mechanism can be reliably received by the vertical plates, the front plate and the like, and the working mechanism can be stably supported all the time. Moreover, by performing a work in an attitude in which the working mechanism is lifted up, for example, even if the working mechanism sways in the left or right direction, twisting deformation or the like of the vertical plate caused by the sway of this working mechanism can be suppressed.

Moreover, since the reinforcing member is provided at the corner portion between the rear surface of the front plate and the vertical plate, an occupied space of the reinforcing member on the rear surface side on the front plate can be kept small, and a large installation space can be ensured when an onboard equipment is installed on the rear surface side of the front plate, for example.

(2) According to the present invention, it is configured such that the left reinforcing member forms a closed space shut at the corner portion between the left vertical plate and the front plate, and the right reinforcing member forms a closed space shut at the corner portion between the right vertical plate and the front plate.

By configuring as above, the reinforcing member forms the closed space shut at the corner portion between the rear surface of the front plate and the vertical plate, and thus, by painting the vertical plate, the front plate, and the reinforcing member from the outside, intrusion of rainwater, washing water and the like into the space surrounded by the vertical plate, the front plate, and the reinforcing plate can be suppressed. As a result, rusting on the front plate, each of the vertical plates, and each of the reinforcing members in the space can be suppressed, and strength of the front plate, each of the vertical plates, and each of the reinforcing members can be kept properly over a long time.

(3) According to the present invention, it is configured such that an intermediate area in a vertical direction of the left reinforcing member is joined to a rear surface of the front plate and the left vertical plate, and an upper area and a lower area of the left reinforcing member are joined to the corner portion between the left vertical plate and the front plate, respectively, and an intermediate area in the vertical direction of the right reinforcing member is joined to the rear surface of the front plate and the right vertical plate, and an upper area and a lower area of the right reinforcing member are joined to the corner portion between the right vertical plate and the front plate, respectively.

With this arrangement, by joining the intermediate area in the vertical direction of each of the reinforcing members to the vertical plate and the front plate and by joining the upper area and the lower area of each of the reinforcing members to the corner portion between the vertical plate and the front plate, respectively, a peripheral edge portion of each of the reinforcing members can be joined to the vertical plate and the front plate over the entire periphery. As a result, a box structural body can be formed by the left vertical plate, the front plate, and the left reinforcing member and a box structural body is formed by the right vertical plate, the front plate, and the right reinforcing member, and a firmer support structural body can be configured by these vertical plates, the front plate, and the reinforcing members.

(4) According to the present invention, it is configured such that an equipment passage hole through which an onboard equipment to be mounted on the bottom plate is inserted is provided in the front plate; the left reinforcing member is joined to the corner portion between the left vertical plate and the front plate sandwiching the equipment passage hole between them, and the right reinforcing member is joined to the corner portion between the right vertical plate and the front plate sandwiching the equipment passage hole between them.

With this arrangement, in assembling the construction machine, the onboard equipment including a revolving motor, a control valve device and the like, for example, are inserted through the equipment passage hole provided in the front plate. In such a case, too, since the left and right reinforcing members are provided sandwiching the equipment passage hole between them, the periphery of the equipment passage hole where strength can easily deteriorate in the front plate can be reliably reinforced by the reinforcing member, and the entire strength of the front plate can be sufficiently ensured.

(5) According to the present invention, it is configured such that a boom mounting portion on which a boom of the working mechanism is mounted and which is located closer to the front side from the front plate and a first cylinder mounting portion on which a boom cylinder for driving the boom is mounted and which is located closer to the lower side than the boom mounting portion are provided on the left and right vertical plates, respectively; left and right second cylinder mounting portions, each being opposed to the left and right first cylinder mounting portions and on each of which the boom cylinder is mounted are provided on the front surface side of the front plate; each of the reinforcing members includes a vertical plate joint portion joined to the vertical plate and extending in the vertical direction and a front plate joint portion joined to the front plate and extending in the vertical direction; and an intermediate area in the vertical direction of the front plate joint portion is joined to the front plate on the rear side of the second cylinder mounting portion.

With this arrangement, the rear sides of the left and right second cylinder mounting portions provided on the front surface side of the front plate can be supported by the left and right reinforcing members sandwiching the front plate. As a result, a load acting by extension/contraction of the boom cylinder can be reliably received by the support structural body formed of the front plate, the vertical plates, and the reinforcing members.

(6) According to the present invention, the construction machine is provided with a lower traveling structure and an upper revolving structure that is rotatably mounted on the lower traveling structure through a revolving device and on which the working mechanism is mounted on the front side, and the revolving frame forms a support structural body of the upper revolving structure.

MODE FOR CARRYING OUT THE INVENTION

Figure 1:
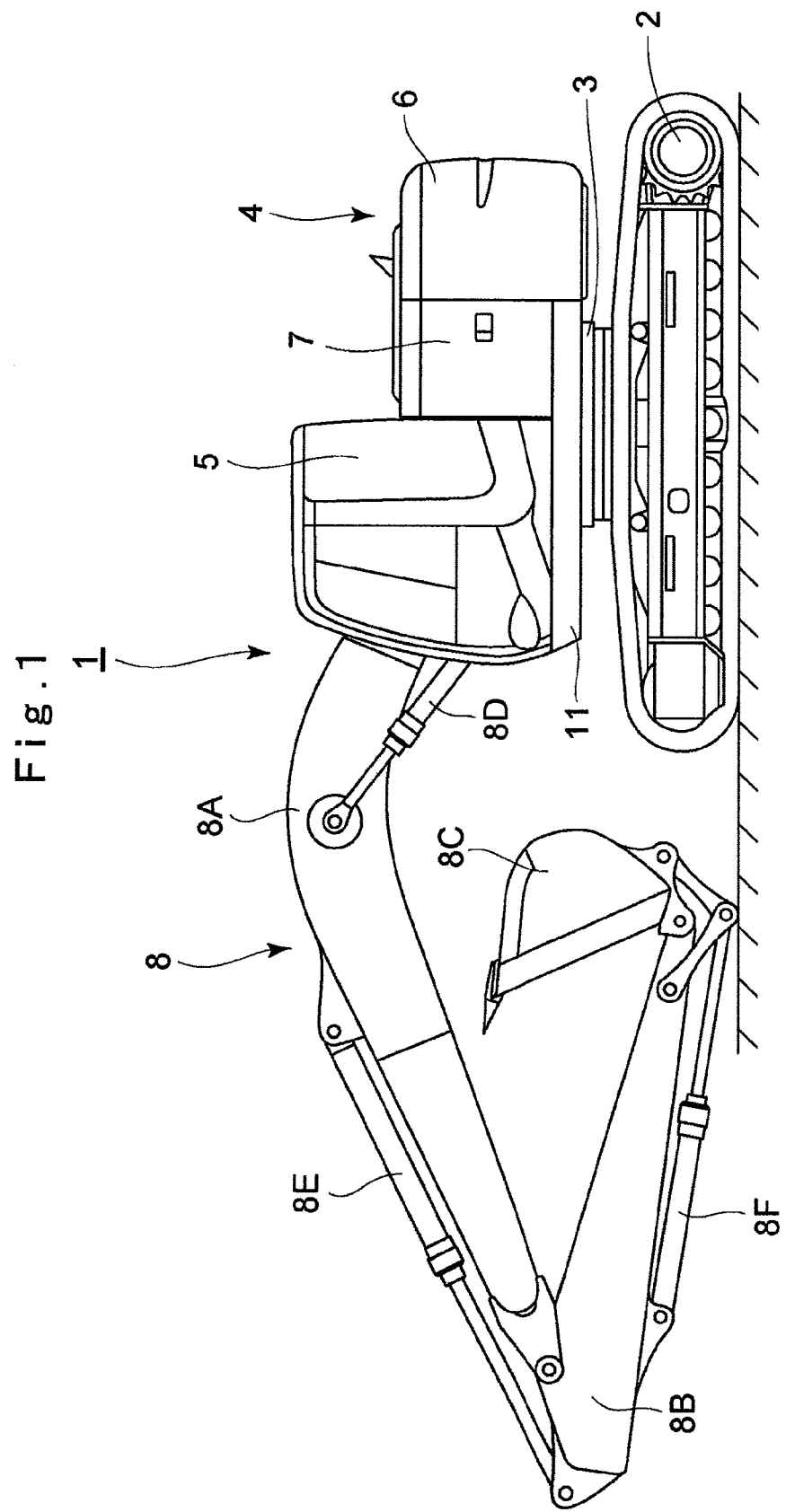
FIG. 1 is a front view illustrating a hydraulic excavator provided with a revolving frame according to an embodiment of the present invention.

An embodiment of a revolving frame of a construction machine according to the present invention will be in detail explained with reference to the accompanying drawings by taking a case in which the revolving frame of a construction machine is applied to a hydraulic excavator provided with a crawler-type lower traveling structure.

In figures, designated at 1 is a hydraulic excavator as a typical example of the construction machine. This hydraulic excavator 1 includes an automotive crawler-type lower traveling structure 2, an upper revolving structure 4 that is rotatably mounted on the lower traveling structure 2 through a revolving device 3, and a working mechanism 8 provided on the front side of the upper revolving structure 4, which will be described hereinafter.

Figure 2:
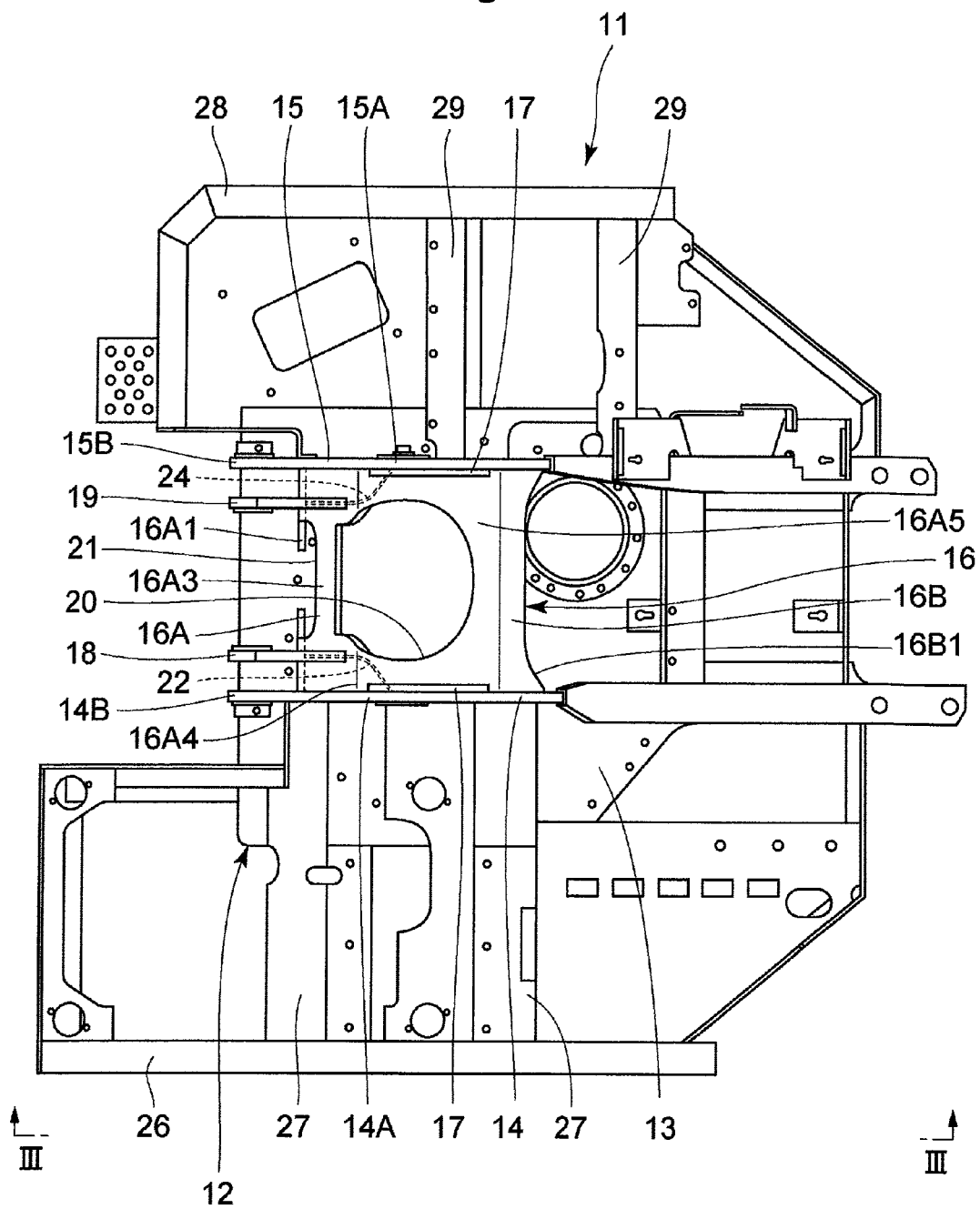
FIG. 2 is a plan view illustrating the revolving frame as a single body.
Figure 3:
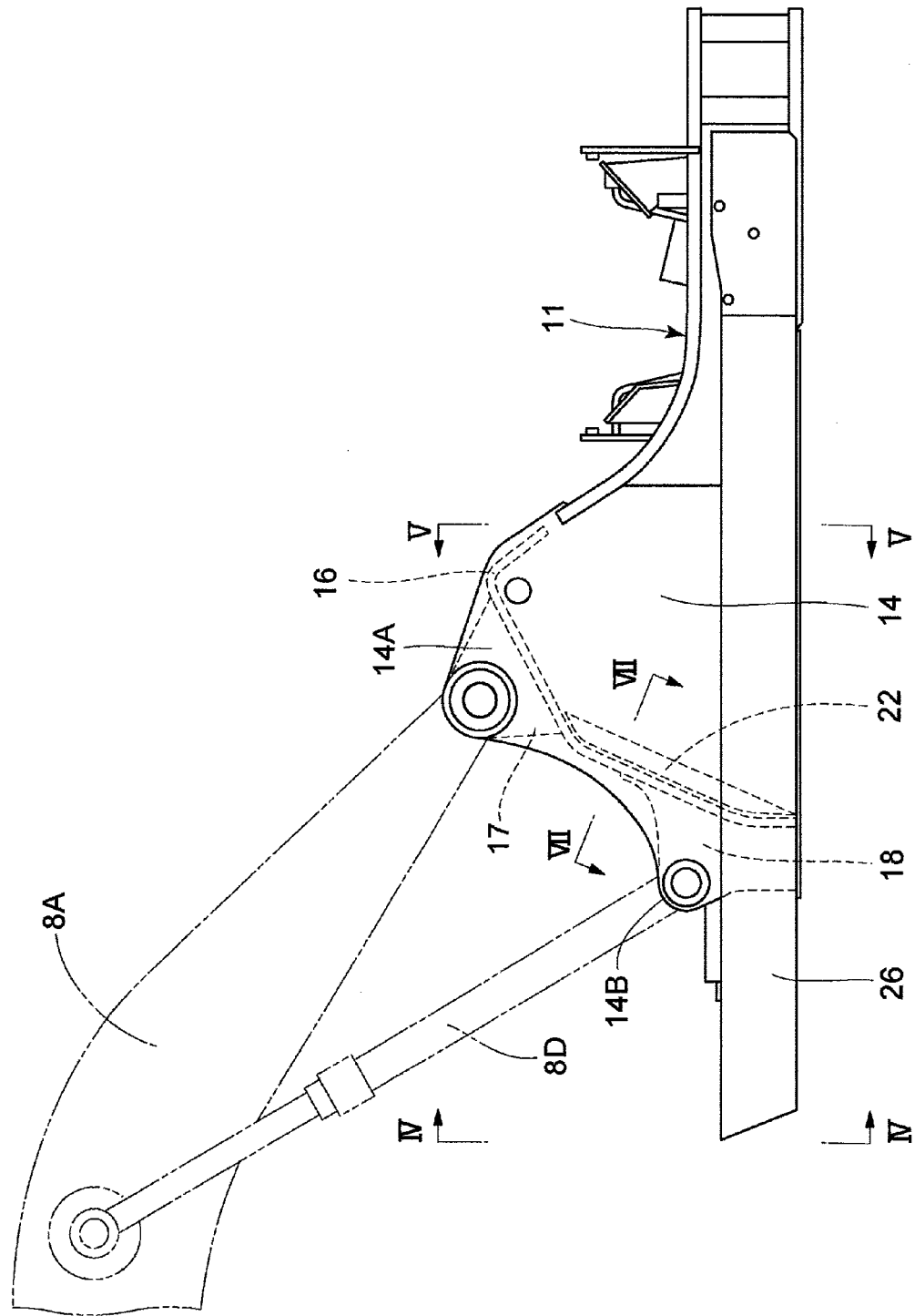
FIG. 3 is a front view of the revolving frame taken from an arrow III-III direction in FIG. 2.
Figure 4:
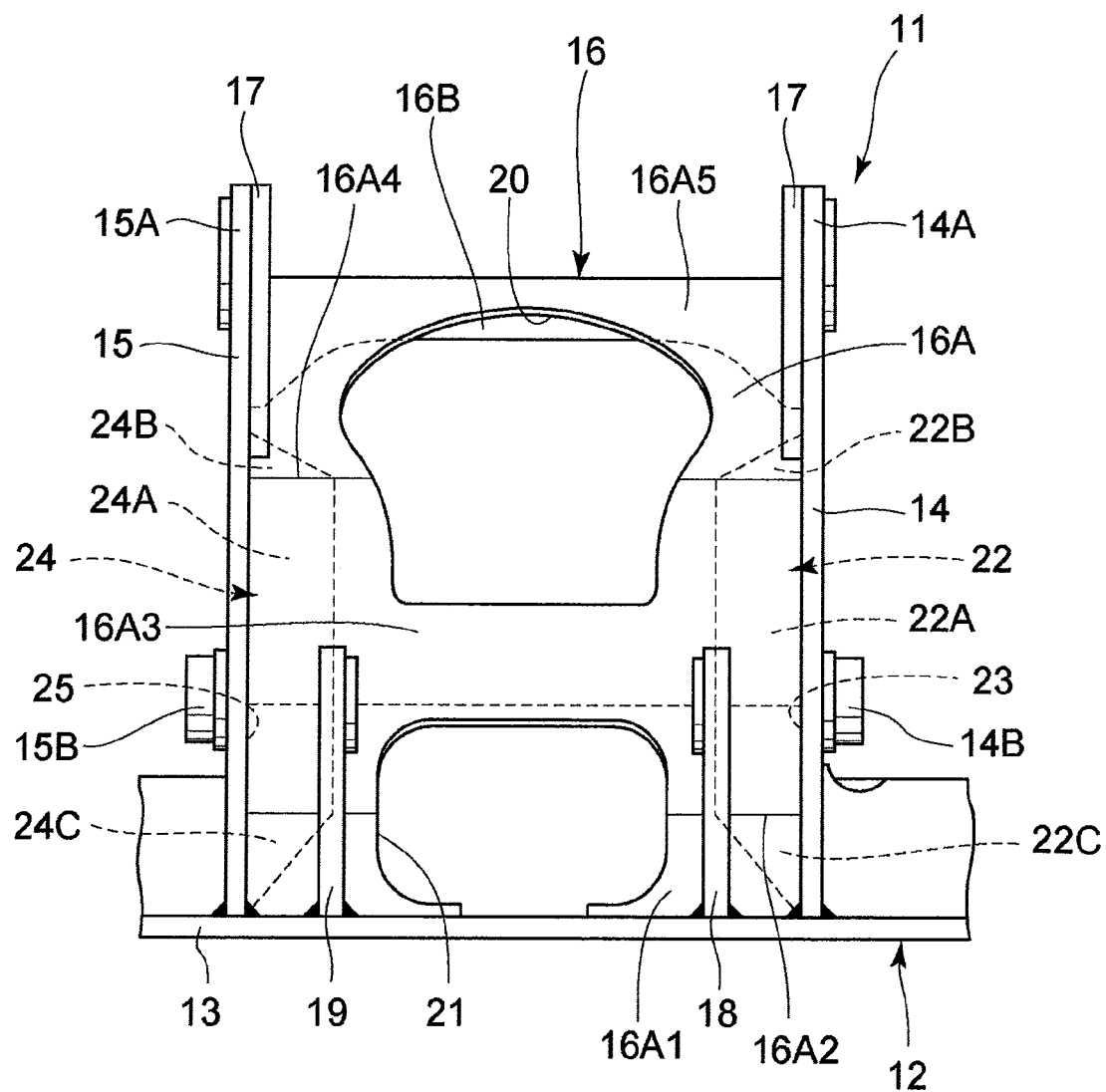
FIG. 4 is a left side view of a vertical plate, a front plate and the like taken from an arrow IV-IV direction in FIG. 3.

Here, as illustrated in FIGS. 1 and 2, the upper revolving structure 4 includes a revolving frame 11 which becomes a base and will be described later, a cab 5 provided on the front left side of the revolving frame 11 and defining an operator's room, a counterweight 6 mounted on a rear end portion of the revolving frame 11 and keeping a weight balance with the working mechanism 8, and a housing cover 7 disposed on the front side of the counterweight 6 and accommodating equipments (none of them is shown) such as an engine, a hydraulic pump, a heat exchanger and the like therein.

The working mechanism 8 is liftably provided on the front part side of the upper revolving structure 4 upward/downward and performing excavating works of earth and sand. This working mechanism 8 includes a boom 8A rotatably mounted on revolving frame 11 which will be described later, an arm 8B rotatably mounted on the distal end portion of the boom 8A, a bucket 8C rotatably mounted on the distal end portion of the arm 8B, two boom cylinders 8D for driving the boom 8A, an arm cylinder 8E for driving the arm 8B, and a bucket cylinder 8F for driving the bucket 8C.

Here, a foot portion (base end portion) of the boom 8A is pin-connected to boom mounting portions 14A and 15A of vertical plates 14 and 15 which will be described later and a boom mounting bracket 17 of a front plate 16. As a result, the boom 8A is supported by the vertical plates 14 and 15 and the front plate 16 constituting the revolving frame 11.

Subsequently, designated at 11 is the revolving frame of the hydraulic excavator 1 according to this embodiment, and the revolving frame 11 constitutes a support structural body of the upper revolving structure 4. This revolving frame 11 includes a center frame 12 which will be described later and is located at the center part in the left and right direction and extends in the front and rear direction, a left side frame 26 which will be described later and is arranged on the left side of the center frame 12 and extends in the front and rear direction, and a right side frame 28 which will be described later and is arranged on the right side of the center frame 12 and extends in the front and rear direction.

The center frame 12 constitutes the center part of the revolving frame 11, and the center frame 12 includes a flat-plate shaped bottom plate 13 extending in the front and rear direction, a left vertical plate 14 and a right vertical plate 15 extending in the front and rear direction on the bottom plate 13 and installed upright at a fixed interval in the left and right direction, the front plate 16 located on the front side of the bottom plate 13 and connecting the vertical plates 14 and 15 to each other, and reinforcing plates 22 and 24 which will be described later.

The bottom plate 13 is formed having a flat-plate shape by using a thick steel plate or the like, for example, and the revolving device 3 is mounted on the lower surface side. On the upper surface side of the bottom plate 13, the onboard equipment (not shown) such as a revolving motor for revolving the upper revolving structure 4 on the lower traveling structure 2 and the like, for example, can be mounted in addition to the vertical plates 14 and 15 and the front plate 16.

Each of the left and right vertical plates 14 and 15 is formed having a flat-plate shape extending in the front and rear direction by using a steel plate or the like, for example. That is, the left vertical plate 14 is located on the left end side of the bottom plate 13 and installed upright substantially perpendicularly to the upper surface of the bottom plate 13, while the right vertical plate 15 is located on the right end side of the bottom plate 13 and installed upright substantially perpendicularly to the upper surface of the bottom plate 13. The left vertical plate 14 and the right vertical plate 15 extend in the front and rear direction in a state where a fixed interval is kept in the left and right direction.

Here, each of the vertical plates 14 and 15 has a mountain shape with the center part in the front and rear direction protruding upward, and the upper end sides of the vertical plates 14 and 15 become the boom mounting portions 14A and 15A, respectively, for mounting the foot portion of the boom 8A constituting the working mechanism 8. On the other hand, the front end sides of the vertical plates 14 and 15 located closer to the lower side than these boom mounting portions 14A and 15A and protruding to the front side become first cylinder mounting portions 14B and 15B for mounting one end side (bottom side) of the boom cylinder 8D. Moreover, the counterweight 6 is configured to be mounted on the rear end side of the vertical plates 14 and 15.

The front plate 16 is located on the front side of the bottom plate 13 and connects the left and right vertical plates 14 and 15 to each other, and the front plate 16 is formed as a strength member by using a steel plate or the like, for example, and supports the working mechanism 8 along with each of the vertical plates 14 and 15. Here, the front plate 16 is formed as a polyangular polyhedron plate (three-angle and four-faced plate in this embodiment) bent at a plurality of spots in the front and rear direction by applying bending work to a steel plate material, for example. That is, the front plate 16 is formed having a mountain shape as a whole by a front surface section 16A extending diagonally rear upward from the bottom plate 13 and a rear surface section 16B extending diagonally rear downward from a top portion (upper end portion) of the front surface section 16A.

In this case, the front surface section 16A of the front plate 16 is formed of a short rising portion 16A1 rising in the perpendicular direction from the bottom plate 13 located on the rear side of the first cylinder mounting portions 14B and 15B provided on the vertical plates 14 and 15, respectively, a lower side inclined portion 16A3 extending diagonally upward while being inclined to the rear side by bending the upper end of the rising portion 16A1 to the rear side at a position of a lower side bent portion 16A2, and an upper side inclined portion 16A5 extending diagonally upward while being inclined to the rear side by bending the upper end of the lower side inclined portion 16A3 further to the rear side at a position of an upper side bent portion 16A4.

On the other hand, a rear surface section 16B of the front plate 16 extends diagonally downward from the top portion of the front surface section 16A (upper side inclined portion 16A5) to the rear. In the rear surface section 16B, a notched portion 16B1 extending to the front from the rear end portion thereof in the left and right direction between the vertical plates 14 and 15 is formed. As described above, by providing the notched portion 16B1 in the rear surface section 16B, this notched portion 16B1 ensures a working space when mounting, removing work, maintenance work and the like of the onboard equipment such as a revolving motor, a center joint and the like mounted on the bottom plate 13 (none of them is shown) are performed.

Thus, the front plate 16 is fixed to the upper surface of the bottom plate 13 by a lower end edge portion of the front surface section 16A (rising portion 16A1) by means such as welding or the like, and left and right side end edge portions of the front surface section 16A and the rear surface section 16B are fixed to the respective opposing inner side faces of the vertical plates 14 and 15 by using welding means. As a result, the front plate 16 is joined to the bottom plate 13 and each of the vertical plates 14 and 15. As described above, the center frame 12 can form a firm box structural body formed of the bottom plate 13, each of the vertical plates 14 and 15, and the front plate 16 and has a configuration that can improve supporting rigidity of the working mechanism 8. Moreover, the left reinforcing plate 22, which will be described later, is provided between the inner side face of the left vertical plate 14 and the rear surface (back surface) of the front plate 16, while the right reinforcing plate 24, which will be described later, is provided between the inner side face of the right vertical plate 15 and the rear surface of the front plate 16.

The left and right boom mounting brackets 17 are provided on the front surface section 16A of the front plate 16, and each of the boom mounting brackets 17 is fixed to the upper side inclined portion 16A5 of the front surface section 16A by using welding means. Each of these boom mounting brackets 17 is arranged adjacent to the boom mounting portions 14A and 15A provided on the vertical plates 14 and 15, respectively. As a result, the boom mounting portions 14A and 15A of the vertical plates 14 and 15 and the left and right boom mounting brackets 17 provided on the front plate 16 are configured to support the boom 8A of the working mechanism 8 in cooperation.

The left and right cylinder mounting brackets 18 and 19 are provided on the front plate 16, located closer to the lower side than the boom mounting brackets 17 and constitute second cylinder mounting portions. Here, the cylinder mounting bracket 18 on the left side is welded to the rising portion 16A1 and the lower side inclined portion 16A3 of the front surface section 16A and the upper surface of the bottom plate 13 in a state opposing the first cylinder mounting portion 14B provided on the left vertical plate 14 at a certain interval. On the other hand, the cylinder mounting bracket 19 on the right side is welded to the rising portion 16A1 and the lower side inclined portion 16A3 of the front surface section 16A and the upper surface of the bottom plate 13 in a state opposing the first cylinder mounting portion 15B provided on the right vertical plate 15 at a certain interval. Therefore, the first cylinder mounting brackets 14B and 15B provided on vertical plates 14 and 15, respectively, and the cylinder mounting brackets 18 and 19 provided on the front plate 16 are configured to support the boom cylinder 8D of the working mechanism 8 in cooperation.

Figure 8:
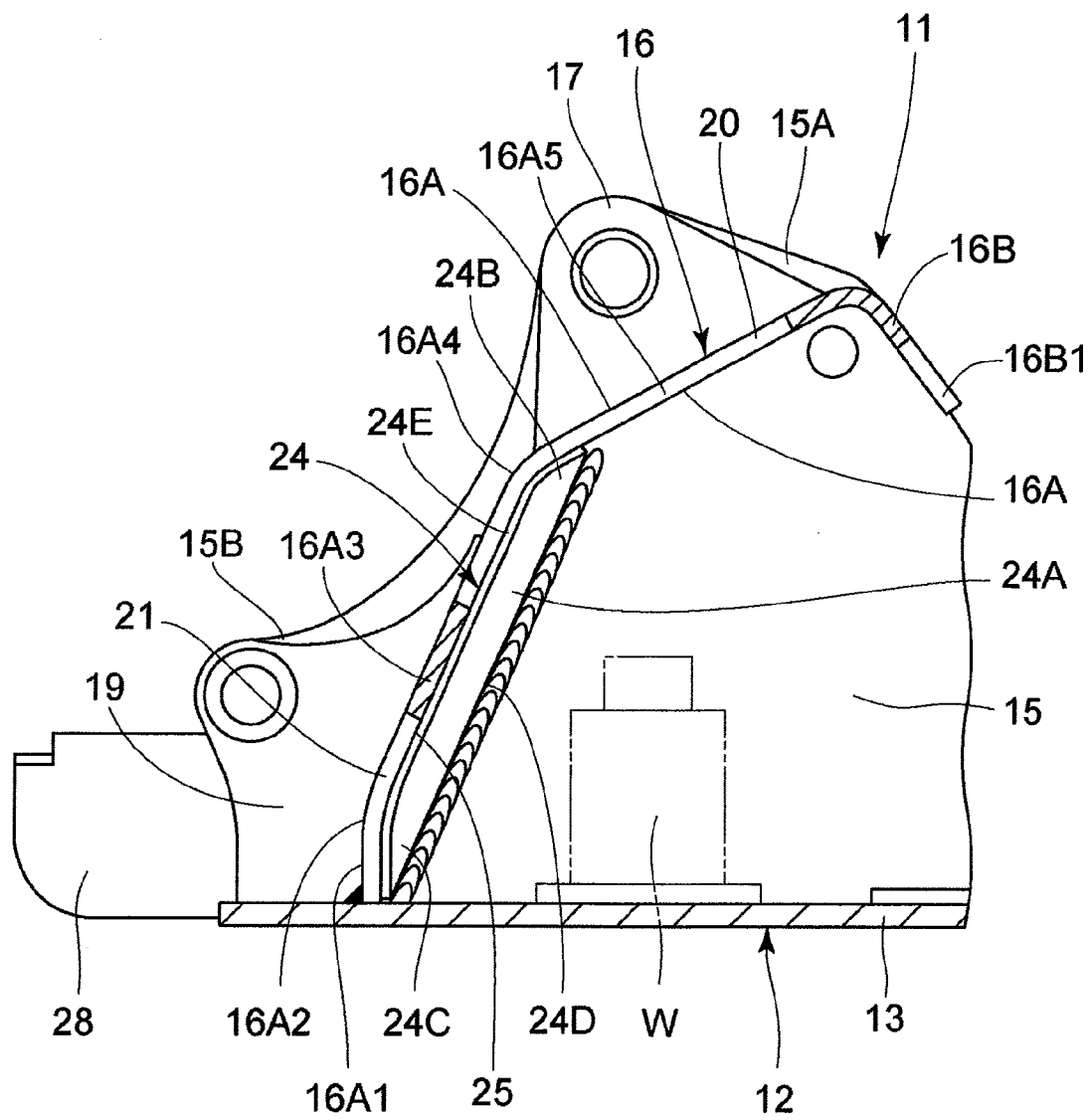
FIG. 8 is a cross-sectional view of the bottom plate, the front plate, the right vertical plate, the right reinforcing plate and the like taken from an arrow VIII-VIII direction in FIG. 5.
Figure 9:
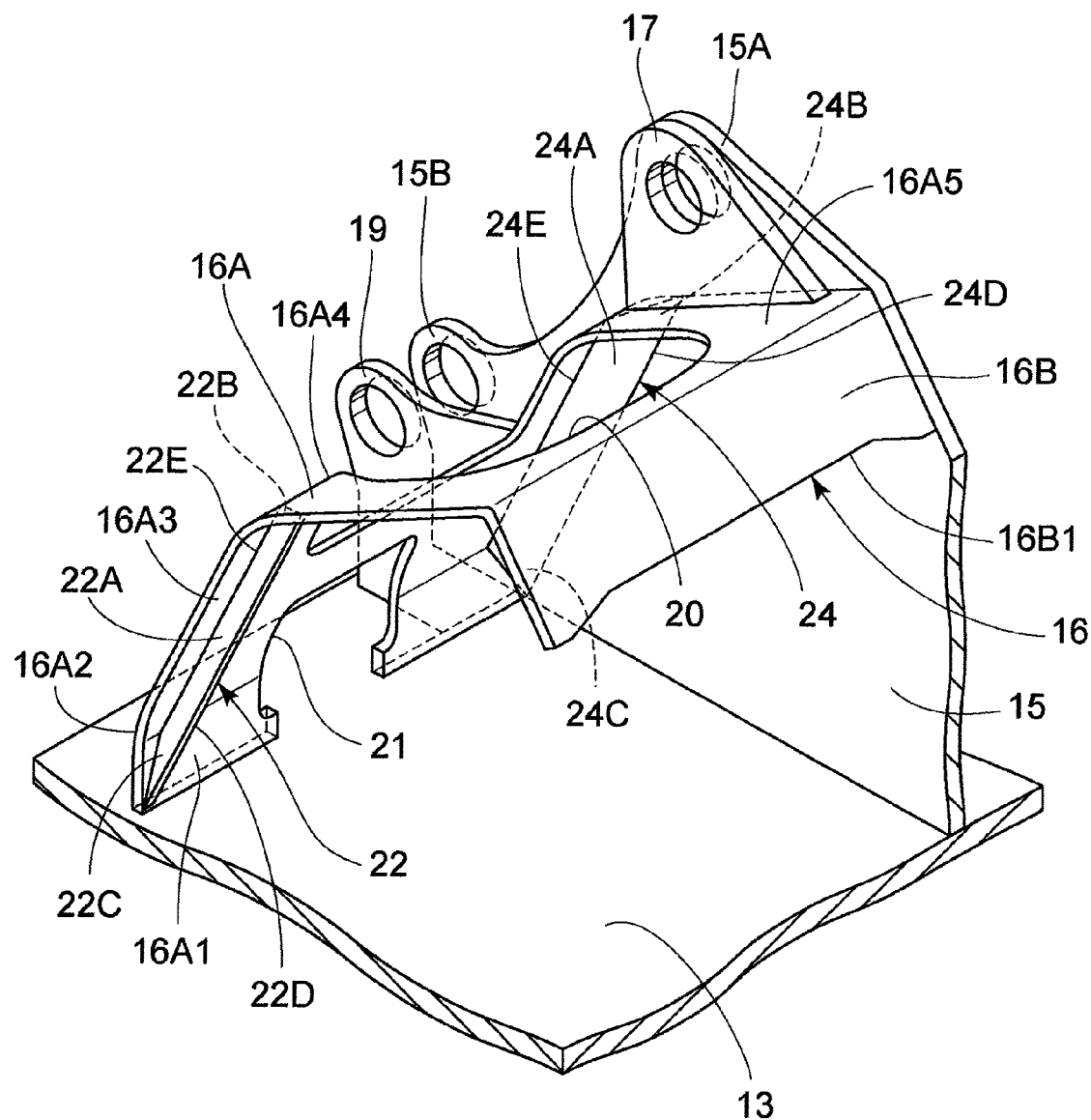
FIG. 9 is an enlarged perspective view of the bottom plate, the right vertical plate, the front plate, and the left and right reinforcing plates taken from diagonally rear side.

An equipment passage hole 20 is provided in the front surface section 16A of the front plate 16, and the equipment passage hole 20 is provided in a range over the lower side inclined portion 16A3 and the upper side inclined portion 16A5 in the front surface section 16A of the front plate 16. When an onboard equipment W such as the revolving motor and the like indicated by a two-dot chain line in FIG. 8 is to be mounted on the bottom plate 13, this onboard equipment W is inserted through this equipment passage hole 20 in the vertical direction, and also this equipment passage hole 20 ensures a working space when a maintenance work for the onboard equipment W is performed.

An opening portion 21 is located closer to the lower side than the equipment passage hole 20 and provided in the front surface section 16A of the front plate 16, and the opening portion 21 is provided in a range over the rising portion 16A1 to the lower side inclined portion 16A3 of the front surface section 16A of the front plate 16. Through this opening portion 21, a plurality of hydraulic hoses (not shown) for supplying pressure oil to the boom cylinder 8D, the arm cylinder 8E, the bucket cylinder 8F and the like constituting the working mechanism 8 are inserted.

Next, designated at 22 is a left reinforcing plate as a left reinforcing member according to this embodiment, and the left reinforcing plate 22 is provided at a position of a corner portion 23 where the inner side face of the left vertical plate 14 and the rear surface of the front plate 16 cross each other and reinforces the left end side of the front plate 16.

Figure 5:
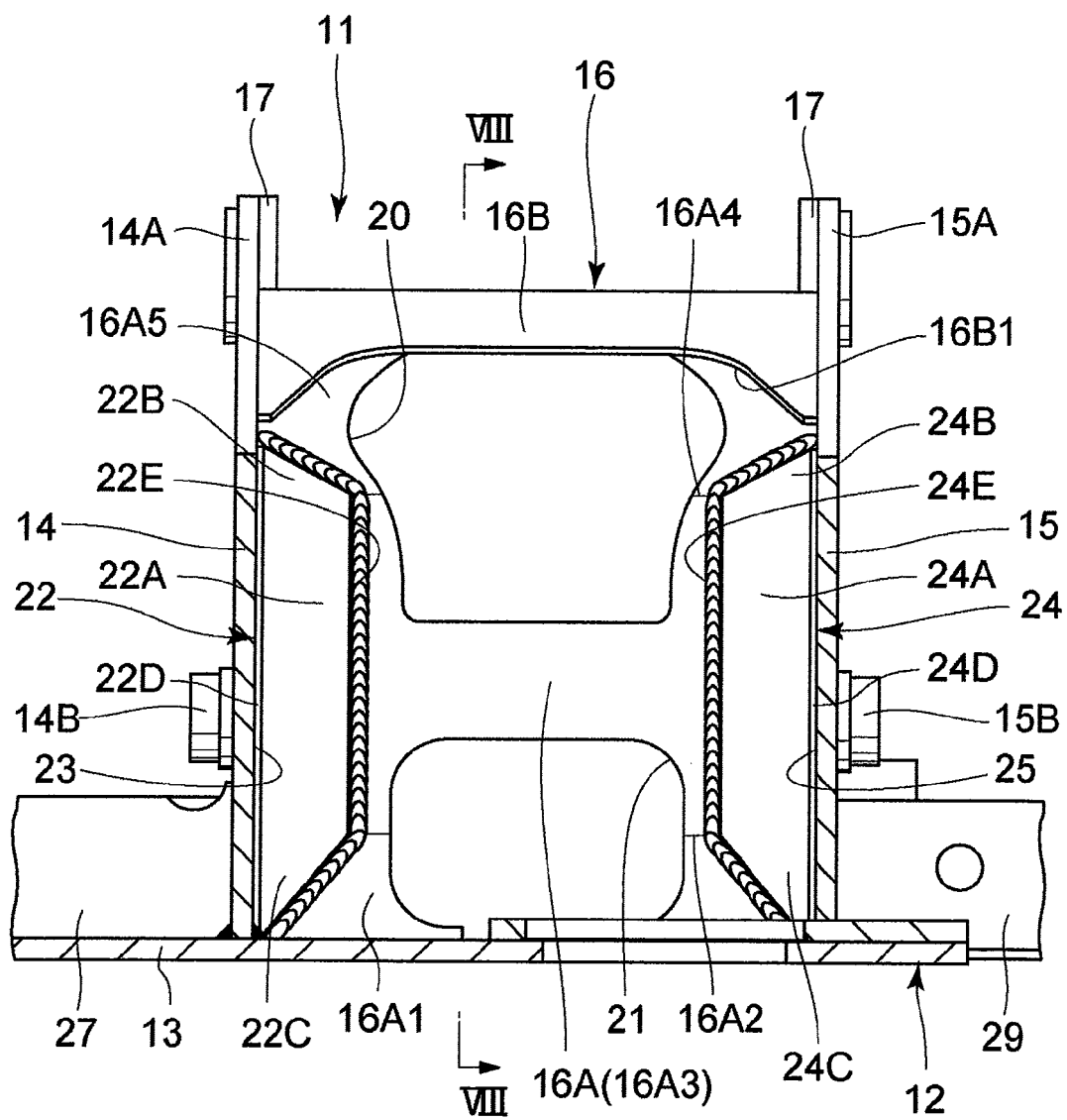
FIG. 5 is a cross-sectional view of a bottom plate, the vertical plate, the front plate, a reinforcing plate and the like taken from an arrow V-V direction in FIG. 3.
Figure 6:
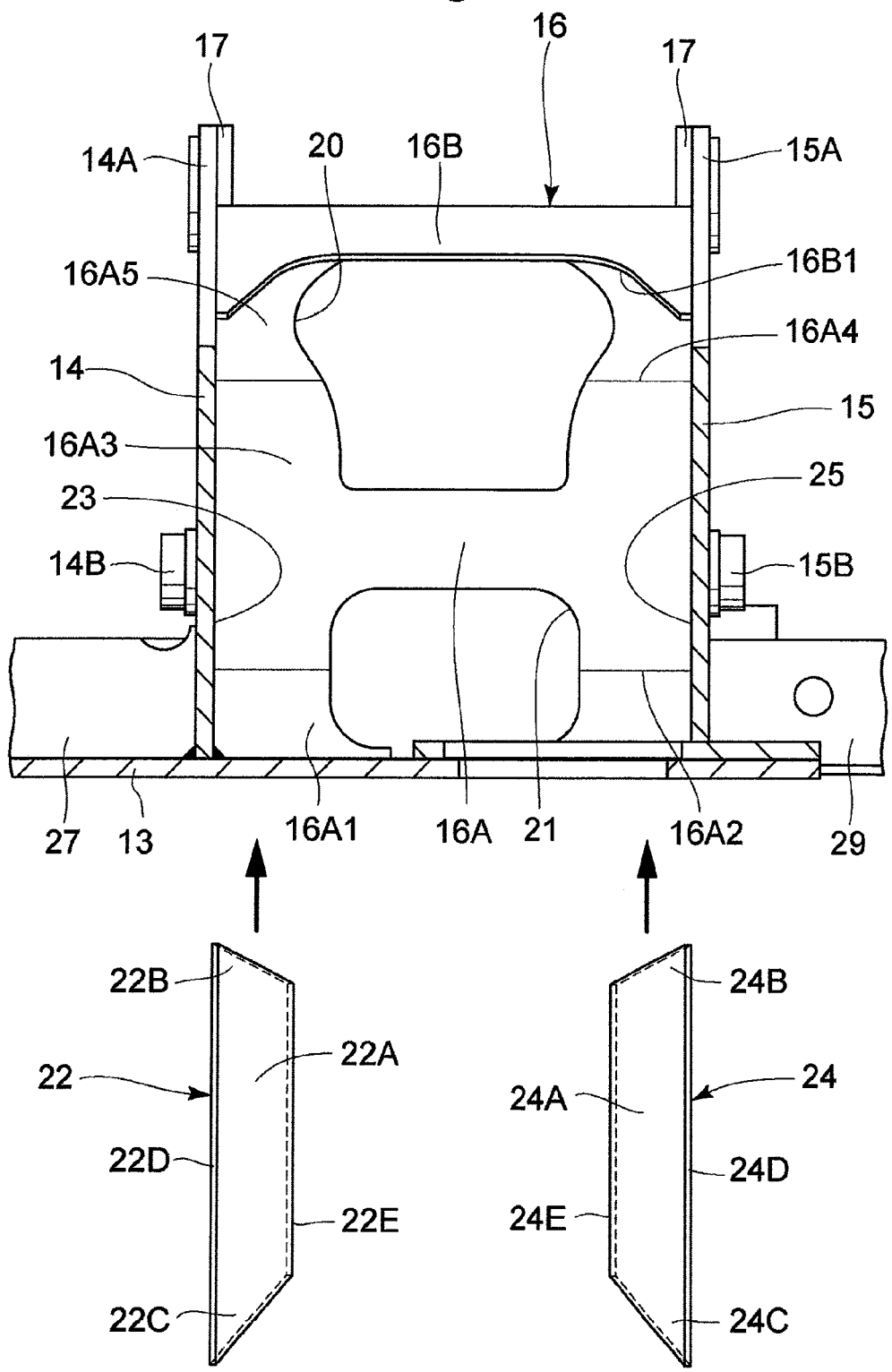
FIG. 6 is a cross-sectional view illustrating the revolving frame and the reinforcing plate in an exploded state taken from a position similar to that in FIG. 5.
Figure 7:
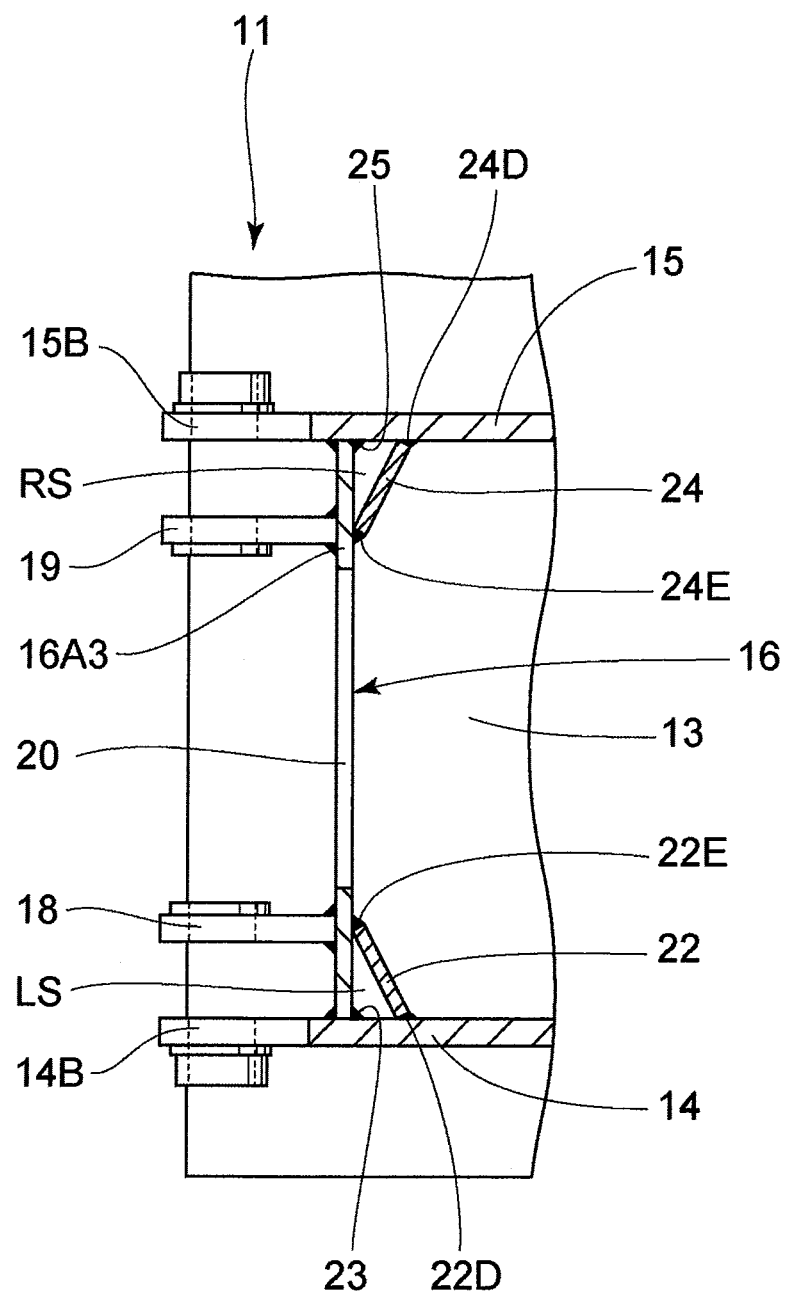
FIG. 7 is a cross-sectional view of the bottom plate, the vertical plate, the front plate, the reinforcing plate and the like taken from an arrow VII-VII direction in FIG. 3.

Here, as illustrated in FIGS. 5, 6 and the like, the left reinforcing plate 22 is formed of a rectangular intermediate area 22A extending in the vertical direction, a triangular upper area 22B extending upward from the intermediate area 22A, and a triangular lower area 22C extending downward from the intermediate area 22A and having a substantially trapezoidal flat-plate shape as a whole. Here, the left end edge of the left reinforcing plate 22 becomes a vertical plate joint portion 22D extending in the vertical direction along the left vertical plate 14, while the right end edge of the left reinforcing plate 22 becomes a front plate joint portion 22E extending in the vertical direction along the rising portion 16A1, the lower side inclined portion 16A3 and the upper side inclined portion 16A5 of the front plate 16.

The vertical plate joint portion 22D of the left reinforcing plate 22 is welded in a range from the lower area 22C to the intermediate area 22A and the upper area 22B on the inner side face of the left vertical plate 14. On the other hand, in the front plate joint portion 22E of the left reinforcing plate 22, the range of the lower area 22C is welded to the rear surface of the rising portion 16A1 of the front plate 16, the range of the intermediate area 22A is welded to the rear surface of the lower side inclined portion 16A3 of the front plate 16, and the range of the upper area 22B is welded to the rear surface of the upper side inclined portion 16A5 of the front plate 16.

As described above, the intermediate area 22A of the left reinforcing plate 22 is joined to the inner side face of the left vertical plate 14 and the rear surface of the front plate 16. On the other hand, the upper area 22B of the left reinforcing plate 22 is joined so as to surround the corner portion 23 where the inner side face of the left vertical plate 14 and the rear surface of the front plate 16 cross each other, and the lower area 22C of the left reinforcing plate 22 is joined so as to surround the corner portion 23 where the inner side face of the left vertical plate 14 and the rear surface of the front plate 16 cross each other. As a result, the left reinforcing plate 22 can form a shut left side closed space LS having a cross-sectional triangular shape between itself and the corner portion 23 where the inner side face of the left vertical plate 14 and the rear surface of the front plate 16 cross each other.

Designated at 24 is the right reinforcing plate as the right reinforcing member according to this embodiment, and the right reinforcing plate 24 is provided at a position of a corner portion 25 where the inner side face of the right vertical plate 15 and the rear surface of the front plate 16 cross each other and reinforces the right end side of the front plate 16.

Here, the right reinforcing plate 24 is formed of a rectangular intermediate area 24A extending in the vertical direction, a triangular upper area 24B extending upward from the intermediate area 24A, and a triangular lower area 24C extending downward from the intermediate area 24A and having a substantially trapezoidal flat-plate shape as a whole similar to the left reinforcing plate 22. Here, the right end edge of the right reinforcing plate 24 becomes a vertical plate joint portion 24D extending in the vertical direction along the right vertical plate 15, while the left end edge of the right reinforcing plate 24 becomes a front plate joint portion 24E extending in the vertical direction along the rising portion 16A1 of the front plate 16, the lower side inclined portion 16A3 and the upper side inclined portion 16A5.

The vertical plate joint portion 24D of the right reinforcing plate 24 is welded to the inner side face of the right vertical plate 15 in a range from the lower area 24C to the intermediate area 24A and the upper area 24B. On the other hand, in the front plate joint portion 24E of the right reinforcing plate 24, the range of the lower area 24C is welded to the rear surface of the rising portion 16A1 of the front plate 16, the range of the intermediate area 24A is welded to the rear surface of the lower side inclined portion 16A3 of the front plate 16, and the range of the upper area 24B is welded to the rear surface of the upper side inclined portion 16A5 of the front plate 16.

As described above, the intermediate area 24A of the right reinforcing plate 24 is joined to the inner side face of the right vertical plate 15 and the rear surface of the front plate 16. On the other hand, the upper area 24B of the right reinforcing plate 24 is joined so as to surround the corner portion 25 where the inner side face of the right vertical plate 15 and the rear surface of the front plate 16 cross each other, and the lower area 24C of the right reinforcing plate 24 is joined so as to surround the corner portion 25 where the inner side face of the right vertical plate 15 and the rear surface of the front plate 16 cross each other. As a result, the right reinforcing plate 24 can form a shut right side closed space RS having a cross-sectional triangular shape between itself and the corner portion 25 where the inner side face of the right vertical plate 15 and the rear surface of the front plate 16 cross each other.

As described above, the left and right reinforcing plates 22 and 24 are arranged so as to sandwich the equipment passage hole 20 provided in the front plate 16 and can reinforce the joint portion between the left vertical plate 14 and the front plate 16 by the left reinforcing plate 22 and can reinforce the joint portion between the right vertical plate 15 and the front plate 16 by the right reinforcing plate 24. As a result, each of the vertical plates 14 and 15, the front plate 16, and each of the reinforcing plates 22 and 24 constitute a firm support structural body for supporting the working mechanism 8.

In this case, a portion corresponding to the intermediate area 22A in the vertical direction in the front plate joint portion 22E of the left reinforcing plate 22 is joined to the rear surface of the front plate 16 on the rear side of the left side cylinder mounting bracket 18, while a portion corresponding to the intermediate area 24A in the vertical direction in the front plate joint portion 24E of the right reinforcing plate 24 is joined to the rear surface of the front plate 16 on the rear side of the right side cylinder mounting bracket 19.

As a result, the rear portion side of each of the cylinder mounting brackets 18 and 19 provided on the front plate 16 can be supported by each of the reinforcing plates 22 and 24 sandwiching the front plate 16. Thus, it is configured such that a load acting by extension/contraction of the boom cylinder 8D can be received by the support structural body made of each of the vertical plates 14 and 15, the front plate 16, and each of the reinforcing plates 22 and 24. Moreover, the first cylinder mounting portions 14B and 15B provided on the front end sides of the vertical plates 14 and 15, respectively, can be also supported from inside by each of the reinforcing plates 22 and 24. As a result, strength of the first cylinder mounting portions 14B and 15B against the load from the boom cylinder 8D can be improved.

On the other hand, the left reinforcing plate 22 is fixed at a position of the corner portion 23 where the inner side face of the left vertical plate 14 and the rear surface of the front plate 16 cross each other and the right reinforcing plate 24 is fixed at a position of the corner portion 25 where the inner side face of the right vertical plate 15 and the rear surface of the front plate 16 cross each other. As a result, it is configured such that a space occupied by the left and right reinforcing plates 22 and 24 on the rear surface side of the front plate 16 can be kept small.

Moreover, the left reinforcing plate 22 forms the left side closed space LS shut between itself and the corner portion 23 where the left vertical plate 14 and the front plate 16 cross each other, and the right reinforcing plate 24 forms the right side closed space RS shut between itself and the corner portion 25 where the right vertical plate 15 and the front plate 16 cross each other. As a result, it is configured such that intrusion of rainwater, washing water and the like into the left and right closed spaces LS and RS can be suppressed, and rusting can be suppressed.

Indicated at 26 is a left side frame arranged on the left side of the center frame 12, and the left side frame 26 is formed by using a D-shaped frame having a D-shaped section, for example, and extends in the front and rear direction along the center frame 12. This left side frame 26 is fixed to the center frame 12 by being joined to a plurality of left extension beams 27 extending from the bottom plate 13 and the left vertical plate 14.

Indicated at 28 is a right side frame arranged on the right side of the center frame 12, and the right side frame 28 is formed by using a D-shaped frame similar to the left side frame 26 and extends in the front and rear direction along the center frame 12. This right side frame 28 is fixed to the center frame 12 by being joined to a plurality of right extension beams 29 extending from the bottom plate 13 and the right vertical plate 15.

The revolving frame 11 of the hydraulic excavator 1 according to this embodiment has the above-described configuration and its operation will be described subsequently.

This hydraulic excavator 1 is self-propelled by the lower traveling structure 2 to a desired work place and performs an excavating work of earth and sand by moving the working mechanism 8 upward/downward while revolving the upper revolving structure 4 on the lower traveling structure 2.

Here, when the excavating work of earth and sand or the like is being performed by using the working mechanism 8, a large load acts on the bottom plate 13, the vertical plates 14 and 15, the front plate 16 and the like of the revolving frame 11 supporting this working mechanism 8 by an excavating reaction force.

In response to that, the revolving frame 11 according to this embodiment is configured such that the left reinforcing plate 22 forming the shut left side closed space LS is fixedly provided at the position of the corner portion 23 where the inner side face of the left vertical plate 14 and the rear surface of the front plate 16 cross each other, and the right reinforcing plate 24 forming the shut right side closed space RS is fixedly provided at the position of the corner portion 25 where the inner side face of the right vertical plate 15 and the rear surface of the front plate 16 cross each other.

As a result, the joint portion between the left vertical plate 14 and the front plate 16 can be reinforced by the left reinforcing plate 22, and the joint portion between the right vertical plate 15 and the front plate 16 can be reinforced by the right reinforcing plate 24. Therefore, a firm support structural body which supports the working mechanism 8 can be configured by these vertical plates 14 and 15, the front plate 16, and the reinforcing plates 22 and 24 without increasing the plate thickness dimension, for example.

As a result, the load such as an excavating reaction force acting from the working mechanism 8 can be reliably received by each of the vertical plates 14 and 15, the front plate 16 and the like, and the working mechanism 8 can be stably supported all the time. Therefore, even if a sway occurs in the working mechanism 8 due to performance of a work with an attitude that the working mechanism 8 is lifted up, for example, twisting deformation or the like of each of the vertical plates 14 and 15 caused by this sway of the working mechanism 8 can be suppressed.

In this case, the intermediate area 22A in the vertical direction of the left reinforcing plate 22 is welded to the inner side face of the left vertical plate 14 and the rear surface of the front plate 16, while the upper area 22B and the lower area 22C of the left reinforcing plate 22 are welded to the corner portion 23 where the left vertical plate 14 and the front plate 16 cross each other, respectively. On the other hand, the intermediate area 24A in the vertical direction of the right reinforcing plate 24 is welded to the inner side face of the right vertical plate 15 and the rear surface of the front plate 16, while the upper area 24B and the lower area 24C of the right reinforcing plate 24 are welded to the corner portion 25 where the right vertical plate 15 and the front plate 16 cross each other, respectively.

Thus, the peripheral edge portion of the left reinforcing plate 22 can be joined to the left vertical plate 14 and the front plate 16 over the entire periphery. Similarly, the peripheral edge portion of the right reinforcing plate 24 can be joined to the right vertical plate 15 and the front plate 16 over the entire periphery. As a result, the left vertical plate 14, the front plate 16, and the left reinforcing plate 22 can form a box structural body whose inside is the left side closed space LS, while the right vertical plate 15, the front plate 16, and the right reinforcing plate 24 form a box structural body whose inside is the right side closed space RS. As a result, each of the reinforcing plates 22 and 24, each of the vertical plates 14 and 15, and the front plate 16 can configure a firmer support structural body and can stably support the working mechanism 8 all the time. Moreover, twisting deformation or the like of each of the vertical plates 14 and 15 caused by a sway of the working mechanism 8 can be reliably prevented, and reliability of the entire revolving frame 11 can be improved.

Moreover, the left reinforcing plate 22 is fixed to the position of the corner portion 23 where the inner side face of the left vertical plate 14 and the rear surface of the front plate 16 cross each other, and the right reinforcing plate 24 is similarly fixed to the position of the corner portion 25 where the inner side face of the right vertical plate 15 and the rear surface of the front plate 16 cross each other. As a result, a space occupied by each of the reinforcing plates 22 and 24 on the rear surface side of the front plate 16 can be kept small, and if the equipments such as a center joint, a revolving motor and the like are to be installed on the rear surface side of the front plate 16, a large installation space can be ensured.

On the other hand, the left reinforcing plate 22 forms the shut left side closed space LS at the position of the corner portion 23 where the left vertical plate 14 and the front plate 16 cross each other, and the right reinforcing plate 24 forms the shut right side closed space RS at the position of the corner portion 25 where the right vertical plate 15 and the front plate 16 cross each other. Thus, intrusion of rainwater, washing water and the like into the space LS surrounded by the left vertical plate 14, the front plate 16, and the left reinforcing plate 22 and the space RS surrounded by the right vertical plate 15, the front plate 16, and the right reinforcing plate 24 can be reliably suppressed. As a result, rusting on each of the vertical plates 14 and 15, the front plate 16, and each of the reinforcing plates 22 and 24 can be prevented, and strength of them can be kept for a long time.

Moreover, the intermediate area 22A in the vertical direction of the front plate joint portion 22E of the left reinforcing plate 22 is joined to the rear surface of the front plate 16 on the rear side of the left side cylinder mounting bracket 18 and the first cylinder mounting portion 14B. Similarly, the intermediate area 24A in the vertical direction of the front plate joint portion 24E of the right reinforcing plate 24 is joined to the rear surface of the front plate 16 on the rear side of the right side cylinder mounting bracket 19 and the first cylinder mounting portion 15B. As a result, the cylinder mounting brackets 18 and 19 and the cylinder mounting portions 14B and 15B provided on the front plate 16 can be supported by each of the reinforcing plates 22 and 24 from the rear side. As a result, the load of the working mechanism 8 acting by extension/contraction of the boom cylinder 8D can be reliably received.

Furthermore, the front plate 16 connecting the vertical plates 14 and 15 to each other is composed of the front surface section 16A extending diagonally rear upward from the bottom plate 13 and the rear surface section 16B extending diagonally rear downward from the top portion (upper end portion) of the front surface section 16A, and the front plate 16 is formed having a mountain shape as a whole. Thus, the mountain shaped front plate 16 can connect the vertical plates 14 and 15 to each other more firmly including the position of the rear surface section 16B.

Similarly, the front plate 16 is formed as a polyangular polyhedron plate bent at a plurality of spots in the front and rear direction by the rising portion 16A1, the lower side inclined portion 16A3, and the upper side inclined portion 16A5 of the front surface section 16A and the rear surface section 16B. As a result, a box structural body can be formed between the vertical plates 14 and 15, and the strength of the support structural body of the working mechanism 8 can be further improved.

Moreover, the left reinforcing plate 22 and the right reinforcing plate 24 are arranged left and right sandwiching the equipment passage hole 20 provided in the front surface section 16A of the front plate 16 and are joined by welding at the positions of the corner portions 23 and 25 where the front plate 16 and the vertical plates 14 and 15 cross each other, respectively. As a result, the periphery of the equipment passage hole 20 having a relatively low strength in the front plate 16 can be reliably reinforced by the reinforcing plates 22 and 24 arranged sandwiching the equipment passage hole 20, and the entire strength of the front plate 16 can be sufficiently ensured.

Figure 10:
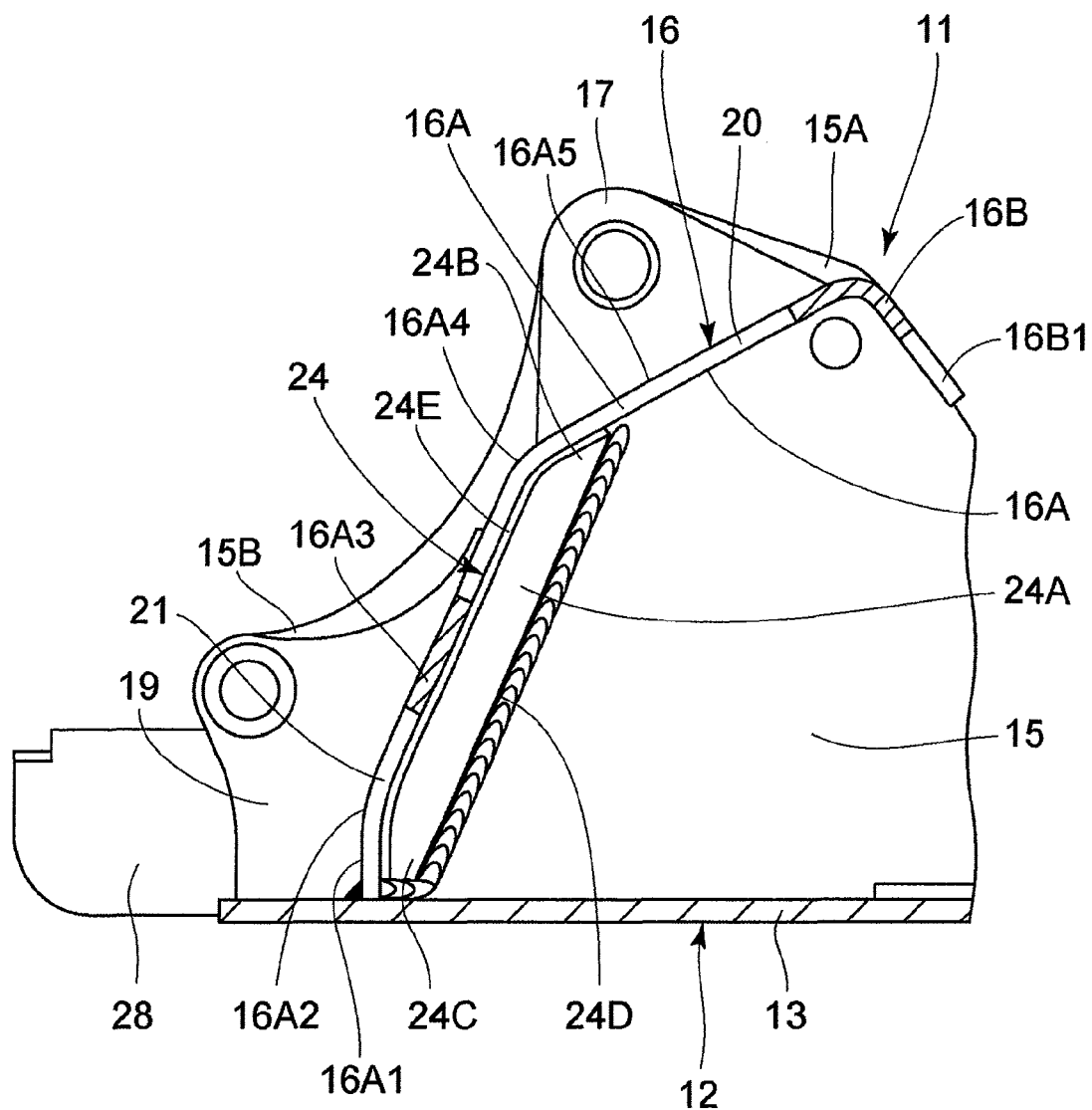
FIG. 10 is a cross-sectional view illustrating the right reinforcing plate according to a first modification at a position similar to that in FIG. 8.

It should be noted that in the above-described embodiment, it is exemplified a case in which the lower area 22C of the left reinforcing plate 22 is welded to the corner portion 23 where the left vertical plate 14 and the rising portion 16A1 of the front plate 16 cross each other, and the lower area 24C of the right reinforcing plate 24 is welded to the corner portion 25 where the right vertical plate 15 and the rising portion 16A1 of the front plate 16 cross each other. However, the present invention is not limited to the same, and may be configured as a first modification illustrated in FIG. 10. That is, it may be configured such that the lower area 24C of the right reinforcing plate 24 is welded to the corner portion 25 where the right vertical plate 15 and the front plate 16 cross each other and also welded to the bottom plate 13. Similarly, though not shown, it may be configured such that the lower area 22C of the left reinforcing plate 22 is welded to the corner portion 23 where the left vertical plate and the front plate 16 cross each other and also welded to the upper surface of the bottom plate 13.

Figure 11:
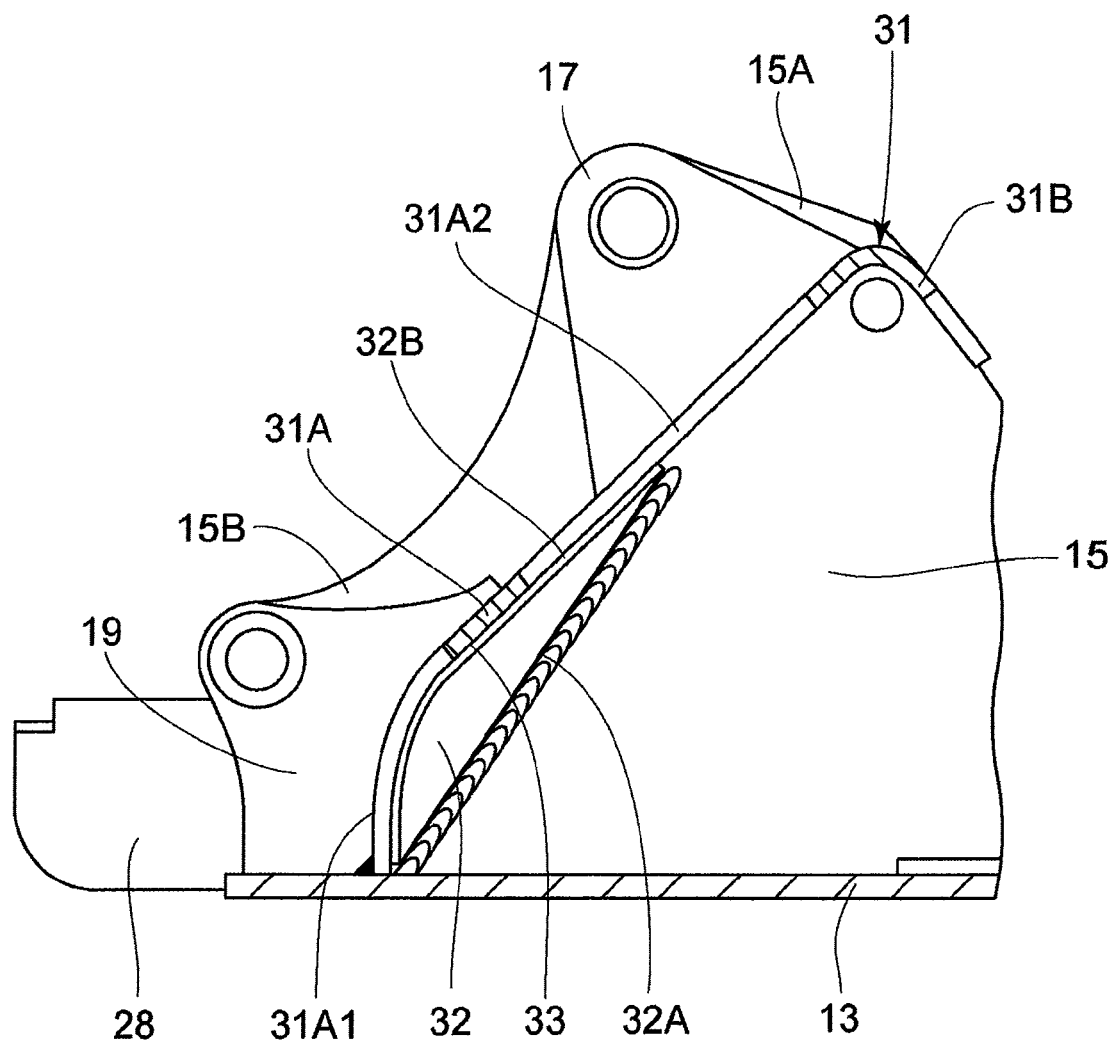
FIG. 11 is a cross-sectional view illustrating the front plate, the right reinforcing plate and the like according to a second modification at a position similar to that in FIG. 8.

In the above-described embodiment, it is exemplified a case in which the front plate 16 is formed as a three-angle and four-faced plate having the front surface section 16A formed of the rising portion 16A1, the lower side inclined portion 16A3, and the upper side inclined portion 16A5 and the rear surface section 16B by bending at three spots in the front and rear direction. However, the present invention is not limited to the same, and it is possible to use a front plate 31 made of a two-angle and three-faced plate as in a second modification illustrated in FIG. 11. That is, a configuration may be such that the front plate 31 including a front surface section 31A formed of a rising portion 31A1 and an inclined portion 31A2 and a rear surface section 31B is used by bending at two spots in the front and rear direction.

In this case, it is configured such that a vertical plate joint portion 32A of a right reinforcing plate 32 is welded to the inner side face of the right vertical plate 15, and a front plate joint portion 32B of the right reinforcing plate 32 is welded to the rising portion 31A1 of the front plate 31 and the rear surface of the inclined portion 31A2 so that the right reinforcing plate 32 is fixed at the position of a corner portion 33 where the right vertical plate 15 and the front plate 31 cross each other. Moreover, it is configured such that a left reinforcing plate (not shown) similar to the right reinforcing plate 32 is also fixed to the corner portion where the front plate 31 and the left vertical plate (not shown) cross each other.

In the above-described embodiment, it is exemplified a case in which the front plate 16 is formed as a three-angle and four-faced plate having the front surface section 16A formed of the rising portion 16A1, the lower side inclined portion 16A3, the upper side inclined portion 16A5 and the rear surface section 16B by bending a single plate material at three spots in the front and rear direction. However, the present invention is not limited to same, and it is possible to adapt a configuration in which the front surface section and the rear surface section are formed as separate members by using two plate materials, for example, and these front surface section and rear surface section are welded so as to have a mountain shape.

Moreover, in the above-described embodiment, a crawler-type hydraulic excavator is cited as an example of a construction machine. However, the present invention is not limited to the same, and may be widely applied to a revolving frame to other types of construction machine provided with the upper revolving structure such as a wheel-type hydraulic excavator, a hydraulic crane and the like, for example.

DESCRIPTION OF REFERENCE NUMERALS

1: Hydraulic excavator (Construction machine)
3: Revolving device
8: Working mechanism
8A: Boom
8D: Boom cylinder
11: Revolving frame
12: Center frame
13: Bottom plate
14: Left vertical plate
14A, 15A: Boom mounting portion
14B, 15B: First cylinder mounting portion
15: Right vertical plate
16, 31: Front plate
18, 19: Cylinder mounting bracket (Second cylinder mounting portion)
20: Equipment passage hole
22: Left reinforcing plate (Reinforcing member)
22A, 24A: Intermediate area
22B, 24B: Upper area
22C, 24C: Lower area
22D, 24D, 32A: Vertical plate joint portion
22E, 24E, 32B: Front plate joint portion
23, 25, 33: Corner portion
24, 32: Right reinforcing plate (Reinforcing member)
LS Left side closed space
RS Right side closed space
W Onboard equipment

The invention claimed is:

1. A revolving frame of a construction machine comprising:
    a flat-plate shaped bottom plate;
    left and right vertical plates extending in front and rear directions, installed upright on said bottom plate and disposed with an interval therebetween; and
    a front plate arranged on a front side of said bottom plate and connecting said left and right vertical plates to each other across the interval;
    a left reinforcing member reinforces said left vertical plate and said front plate against a load from a working mechanism and the left reinforcing member is fixed at a left corner portion where said left vertical plate and said front plate cross each other,
    where said left reinforcing member defines a closed space at said left corner portion between said left vertical plate and said front plate, and
    where an upper area and a lower area of said left reinforcing member are joined to said corner portion between said left vertical plate and said front plate, respectively, and an intermediate area, in a vertical direction, of said left reinforcing member is joined to a rear surface of said front plate and said left vertical plate; and
    a right reinforcing member reinforces said right vertical plate and said front plate against the load from said working mechanism and the right reinforcing member is fixed at a right corner portion where said right vertical plate and said front plate cross each other,
    wherein said right reinforcing member defines a closed space at said right corner portion between said right vertical plate and said front plate, and
    wherein an upper area and a lower area of said right reinforcing member are joined to said corner portion between said right vertical plate and said front plate, respectively, and an intermediate area, in the vertical direction, of said right reinforcing member is joined to the rear surface of said front plate and said right vertical plate.

2. The revolving frame of a construction machine according to claim 1, wherein an equipment passage hole through which an onboard equipment to be mounted on said bottom plate is inserted is provided in said front plate; said left reinforcing member is joined to said left corner portion between said left vertical plate and said front plate sandwiching said equipment passage hole between them, and said right reinforcing member is joined to said right corner portion between said right vertical plate and said front plate sandwiching said equipment passage hole between them.

3. The revolving frame of a construction machine according to claim 1, further comprising:
    a boom mounting portion on which a boom of said working mechanism is mounted and which is located closer to the front side from said front plate and a first cylinder mounting portion on which a boom cylinder for driving said boom is mounted and which is located closer to the lower side than said boom mounting portion are provided on said left and right vertical plates respectively;
    left and right second cylinder mounting portions each being opposed to said left and right first cylinder mounting portions and on each of which said boom cylinder is mounted are provided on the front surface side of said front plate;
    each of said reinforcing members includes a vertical plate joint portion joined to said vertical plate and extending in the vertical direction and a front plate joint portion joined to said front plate and extending in the vertical direction; and an intermediate area in the vertical direction of said front plate joint portion is joined to said front plate on the rear side of said second cylinder mounting portion.

4. The revolving frame of a construction machine according to claim 1, wherein said construction machine is provided with a lower traveling structure and an upper revolving structure that is rotatably mounted on said lower traveling structure through a revolving device and on which said working mechanism is mounted on the front side, and said revolving frame forms a support structural body of said upper revolving structure.

\* \* \* \* \*